United States Patent
Kim et al.

(10) Patent No.: US 12,535,532 B2
(45) Date of Patent: Jan. 27, 2026

(54) BATTERY DIAGNOSING APPARATUS AND METHOD

(71) Applicant: LG Energy Solution, Ltd., Seoul (KR)

(72) Inventors: Young-Deok Kim, Daejeon (KR); Dae-Soo Kim, Daejeon (KR); Soon-Ju Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 505 days.

(21) Appl. No.: 18/012,004

(22) PCT Filed: Mar. 22, 2022

(86) PCT No.: PCT/KR2022/004009
§ 371 (c)(1),
(2) Date: Dec. 21, 2022

(87) PCT Pub. No.: WO2022/203367
PCT Pub. Date: Sep. 29, 2022

(65) Prior Publication Data
US 2023/0266400 A1   Aug. 24, 2023

(30) Foreign Application Priority Data
Mar. 26, 2021   (KR) .................. 10-2021-0039998

(51) Int. Cl.
*G06F 11/30*   (2006.01)
*G01R 31/36*   (2020.01)
(Continued)

(52) U.S. Cl.
CPC ....... *G01R 31/392* (2019.01); *G01R 31/3648* (2013.01); *G01R 31/388* (2019.01); *G01R 31/389* (2019.01); *H02J 7/0049* (2020.01)

(58) Field of Classification Search
CPC .................................................. G01R 31/392
See application file for complete search history.

(56) References Cited

U.S. PATENT DOCUMENTS

2003/0030442 A1   2/2003   Sugimoto
2005/0017686 A1   1/2005   Sakakibara et al.
(Continued)

FOREIGN PATENT DOCUMENTS

JP   3743439 B2   2/2006
JP   4372470 B2   11/2009
(Continued)

OTHER PUBLICATIONS

Extended European Search Report including Written Opinion for Application No. 22776067.5 dated Dec. 4, 2023, pp. 1-8.
(Continued)

*Primary Examiner* — Phuong Huynh
(74) *Attorney, Agent, or Firm* — Lerner David LLP (57) ABSTRACT

A battery diagnosing apparatus according to an embodiment includes a measuring unit configured to measure an open circuit voltage (OCV) of a battery after charging of the battery is finished and measure a resistance of the battery while the battery is discharged for a predetermined time after the charging of the battery is finished; and a control unit configured to receive voltage information for the OCV and resistance information for the resistance from the measuring unit, calculate a voltage deviation between the OCV and a criterion voltage preset for the battery, calculate a resistance deviation between the resistance and a criterion resistance preset for the battery, and diagnose whether degradation of the battery is accelerated based on the voltage deviation and the resistance deviation.

9 Claims, 5 Drawing Sheets

(51) Int. Cl.
    *G01R 31/388*     (2019.01)
    *G01R 31/389*     (2019.01)
    *G01R 31/392*     (2019.01)
    *H02J 7/00*     (2006.01)

(56) References Cited

U.S. PATENT DOCUMENTS

| | | |
|---|---|---|
| 2005/0017687 A1 | 1/2005 | Nagaoka |
| 2011/0112782 A1 | 5/2011 | Majima et al. |
| 2012/0262180 A1* | 10/2012 | Ishishita ............ G01R 31/3842 324/430 |
| 2012/0274281 A1 | 11/2012 | Kim |
| 2021/0218262 A1 | 7/2021 | Bae et al. |
| 2021/0318388 A1 | 10/2021 | Bae et al. |
| 2021/0325475 A1* | 10/2021 | Bae .................... G01R 31/3835 |
| 2021/0325476 A1 | 10/2021 | Bae et al. |

FOREIGN PATENT DOCUMENTS

| | | |
|---|---|---|
| JP | 201019758 A | 1/2010 |
| JP | 5638779 B2 | 12/2014 |
| JP | 202046277 A | 3/2020 |
| KR | 100911317 B1 | 8/2009 |
| KR | 20150084354 A | 7/2015 |
| KR | 20160103396 A | 9/2016 |
| KR | 20200111015 A | 9/2020 |
| KR | 20200111016 A | 9/2020 |
| WO | 2020/189914 A1 | 9/2020 |
| WO | 2020/189915 A1 | 9/2020 |
| WO | 2020189919 A1 | 9/2020 |

OTHER PUBLICATIONS

Search report from International Application No. PCT/KR2022/004009, mailed on Jul. 21, 2022.

\* cited by examiner

BATTERY DIAGNOSING APPARATUS AND METHOD

CROSS-REFERENCE TO RELATED APPLICATIONS

The present application is a national phase entry under 35 U.S.C. § 371 of International Application No. PCT/KR2022/004009 filed on Mar. 22, 2022, which claims priority to Korean Patent Application No. 10-2021-0039998 filed on Mar. 26, 2021, the disclosures of which are incorporated herein by reference.

TECHNICAL FIELD

The present disclosure relates to a battery diagnosing apparatus and method, and more particularly, to a battery diagnosing apparatus and method capable of diagnosing a degradation state of a battery.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

In order to diagnose the degradation state of the battery, a technique for analyzing the behavior change of a peak (feature point) included in the differential profile is conventionally used.

Figure 1:
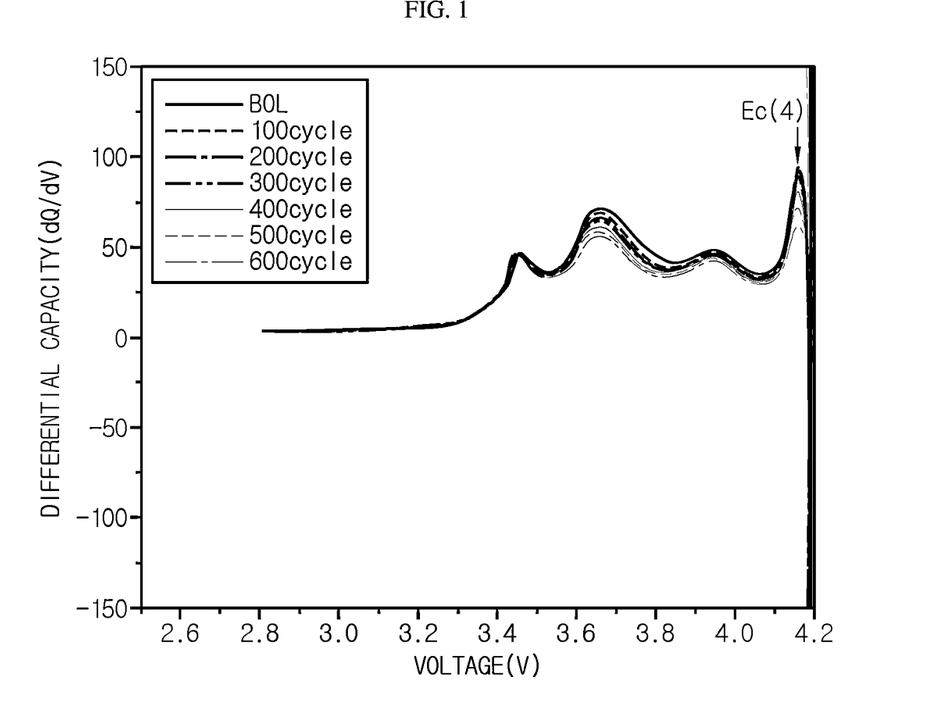
FIG. 1 is a diagram schematically showing a differential profile representing a corresponding relationship between a battery voltage and a differential capacity.

FIG. 1 is a diagram schematically showing a differential profile representing a corresponding relationship between a battery voltage and a differential capacity.

For example, referring to FIG. 1, conventionally, it is possible to diagnose whether degradation of a battery is accelerated by generating a differential profile for the battery and checking the behavior of the peak Ec (4) included in the differential profile.

However, in order to diagnose whether degradation of a battery is accelerated in the conventional way, it is essentially demanded to generate a differential profile. In order to generate a differential profile, there is a problem in that a charging and discharging process for fully charging a fully discharged battery or fully discharging a fully charged battery is required. In addition, there is a problem in that processing voltage and capacity data of the battery obtained in the charging and discharging process is required in order to calculate the differential capacity.

SUMMARY

Technical Problem

The present disclosure is designed to solve the problems of the related art, and therefore the present disclosure is directed to providing a battery diagnosing apparatus and method capable of rapidly and conveniently diagnosing whether degradation of a battery is accelerated based on voltage and resistance of the battery whenever the battery is charged.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery diagnosing apparatus according to one aspect of the present disclosure may comprise: a controller and memory having programmed thereon instructions that, when executed, are configured to cause the controller to receive a measurement of an open circuit voltage (OCV) of a battery after charging of the battery is finished; and a measurement of a resistance of the battery while the battery is discharged for a predetermined time after the charging of the battery is finished; receive the determined voltage information for the OCV and the determined resistance information for the resistance, calculate a voltage deviation between the OCV and a criterion voltage preset for the battery, calculate a resistance deviation between the resistance and a criterion resistance preset for the battery, and diagnose whether degradation of the battery is accelerated based on the voltage deviation and the resistance deviation.

The instructions may be configured to cause the controller to control the battery to finish charging when the SOC reaches a preset upper limit SOC.

The instructions may be configured to cause the controller to calculate a voltage-resistance ratio, the voltage-resistance ratio being a ratio of the resistance deviation to the voltage deviation, when charging of the battery is finished; and diagnose whether degradation of the battery is accelerated based on the plurality of calculated voltage-resistance ratios.

The instructions may be configured to cause the controller to determine an increase/decrease pattern between the plurality of voltage-resistance ratios; and diagnose whether degradation of the battery is accelerated according to the determined increase/decrease pattern.

The instructions may be configured to cause the controller to diagnose that degradation of the battery is accelerated when the increase/decrease pattern is determined to be an increase pattern.

The instructions may be configured to cause the controller to reduce the preset upper limit SOC when the increase/decrease pattern is determined to be an increase pattern.

The instructions may be configured to cause the controller to compare a change rate for the plurality of voltage-resistance ratios with a preset criterion change rate; and determine the increase/decrease pattern based on the comparison result.

The instructions may be configured to cause the controller to generate a fluctuation curve representing increase/decrease for the plurality of voltage-resistance ratios; and determine that the increase/decrease pattern is an increase pattern when a slope of the fluctuation curve is equal to or greater than the criterion change rate.

The instructions may be configured to cause the controller to determine that a high nickel-based positive electrode material is contained in the battery when the increase/decrease pattern is determined to be an increase pattern.

A battery pack according to another aspect of the present disclosure may comprise the battery diagnosing apparatus according to one aspect of the present disclosure.

A battery diagnosing method according to still another aspect of the present disclosure may comprise: receiving, by a controller, a measurement of an OCV of a battery after charging of the battery is finished; receiving, by the controller, a measurement of a resistance of the battery while the battery is discharged for a predetermined time after the charging of the battery is finished; calculating, by the controller, a voltage deviation between the OCV and a criterion voltage preset for the battery, calculating, by the controller, a resistance deviation between the resistance and a criterion resistance preset for the battery; and diagnosing, by the controller, whether degradation of the battery is accelerated based on the voltage deviation and the resistance deviation.

Advantageous Effects

According to an aspect of the present disclosure, whenever the SOC of the battery reaches the upper limit SOC, it may be diagnosed whether the degradation of the battery is accelerated based on the voltage deviation and resistance deviation for the battery. Thus, the charging and discharging process (e.g., a full charging and full discharging process) unnecessary to judge whether the degradation is accelerated is not required, and there is an advantage that it may be quickly diagnosed through a relatively simple calculation whether the degradation is accelerated.

The effects of the present disclosure are not limited to the effects mentioned above, and other effects not mentioned will be clearly understood by those skilled in the art from the description of the claims.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 2:
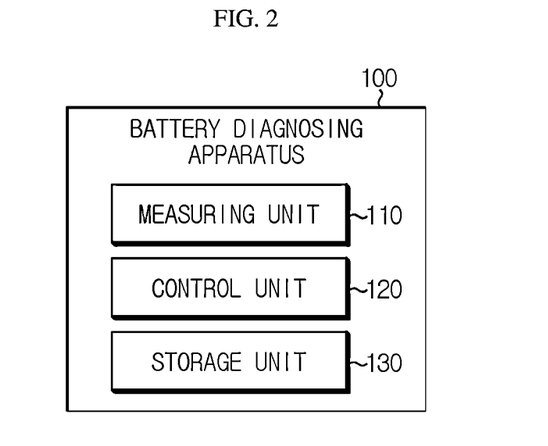
FIG. 2 is a diagram schematically showing a battery diagnosing apparatus according to an embodiment of the present disclosure.

FIG. 2 is a diagram schematically showing a battery diagnosing apparatus 100 according to an embodiment of the present disclosure.

Referring to FIG. 2, the battery diagnosing apparatus 100 may include a measuring unit 110 and a control unit 120.

The measuring unit 110 may be configured to measure an OCV (Open Circuit Voltage) of a battery after charging of the battery is finished.

Here, the battery means a physically separable one independent cell having a negative electrode terminal and a positive electrode terminal. For example, a lithium-ion battery or a lithium polymer battery may be considered as the battery. In addition, the battery may refer to a battery module in which a plurality of cells are connected in series and/or in parallel. Hereinafter, for convenience of explanation, the battery will be described as meaning one independent cell.

Specifically, when the SOC (State of Charge) of the battery reaches a preset upper limit SOC, charging of the battery may be finished. After charging of the battery is finished, the measuring unit 110 may measure the OCV (Open Circuit Voltage) of the battery after a preset rest period.

For example, after charging of the battery is finished, the measuring unit 110 may measure the OCV of the battery after a rest period of 10 minutes.

The measuring unit 110 may be configured to measure the resistance of the battery while the battery is discharged for a predetermined time after the charging of the battery is finished.

Preferably, after the OCV of the battery is measured by the measuring unit 110, the battery may be discharged for a predetermined time. The measuring unit 110 may measure the resistance of the battery based on a voltage drop value of the battery while the battery is being discharged and a discharge amount output from the battery.

For example, after the OCV of the battery is measured, the battery may be discharged for a predetermined time (e.g., 1 minute). The measuring unit 110 may measure the voltage drop value of the battery for 1 minute. Also, the measuring unit 110 may measure the discharge amount by accumulating the discharge current output from the battery for 1 minute. In addition, the measuring unit 110 may measure the resistance of the battery based on the voltage drop value and the discharge amount.

Specifically, the measuring unit 110 may measure the resistance of the battery in consideration of ohmic resistance, charge transfer resistance and diffusion resistance for the battery by measuring the resistance of the battery while a predetermined time elapses after the OCV of the battery is measured.

The control unit 120 may be configured to receive voltage information for the OCV and resistance information for the resistance from the measuring unit 110.

For example, the measuring unit 110 and the control unit 120 may be connected to each other to be able to communicate. The measuring unit 110 may output the voltage information for the OCV of the battery and the resistance information for the resistance, and the control unit 120 may receive the voltage information and the resistance information output from the measuring unit 110.

The control unit 120 may be configured to calculate a voltage deviation between the OCV and a criterion voltage preset for the battery.

Preferably, the criterion voltage may be an OCV measured when the battery is in a BOL (Beginning of Life) state. For example, the BOL state may mean a state where the battery is in the 0 cycle. In addition, the control unit 120 may calculate a voltage deviation for the battery by computing a difference between the criterion voltage and the OCV measured by the measuring unit 110.

For example, the voltage deviation may be calculated as a difference between the criterion voltage and the measured OCV or a ratio between the criterion resistance and the measured OCV.

Hereinafter, for convenience of explanation, the voltage deviation will be described as a voltage difference between the criterion voltage and the measured OCV. That is, the voltage deviation may be calculated according to the formula of "OCV–criterion voltage".

Figure 3:
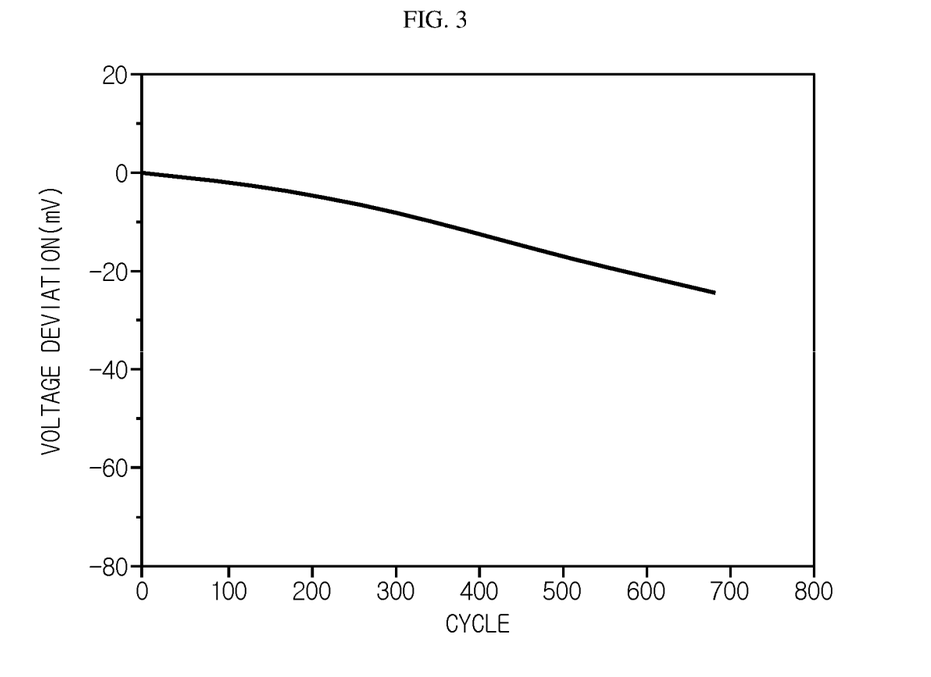
FIG. 3 is a diagram schematically showing a voltage deviation of a battery calculated by the battery diagnosing apparatus according to an embodiment of the present disclosure.

FIG. 3 is a diagram schematically showing a voltage deviation of a battery calculated by the battery diagnosing apparatus 100 according to an embodiment of the present disclosure.

Specifically, FIG. 3 is a diagram showing a voltage deviation of the battery calculated for each cycle. That is, the battery is charged until the SOC reaches the upper limit SOC in each cycle, and the OCV may be measured by the measuring unit 110 after the charging is finished. In addition, the control unit 120 may calculate a voltage deviation of the battery for each cycle based on the criterion voltage and the OCV measured in each cycle.

For example, the OCV after charging of the battery is finished in the 0 cycle may be set as the criterion voltage. Thereafter, the measuring unit 110 may measure the OCV of the battery in each cycle, and the control unit 120 may calculate a voltage deviation for the battery by computing the formula of "OCV–criterion voltage".

The control unit 120 may be configured to calculate a resistance deviation between the resistance and a criterion resistance preset for the battery.

Preferably, the criterion resistance may be a resistance measured when the battery is in the BOL state. That is, the control unit 120 may calculate a resistance deviation for the battery based on the difference between the criterion resistance and the resistance measured by the measuring unit 110.

For example, the resistance deviation may be calculated as a difference between the criterion resistance and the measured resistance or a ratio of the criterion resistance and the measured resistance.

Hereinafter, for convenience of explanation, the resistance deviation will be described as a ratio of resistance to criterion resistance. That is, the resistance deviation may be calculated according to the formula of "(resistance÷criterion resistance)×100".

Figure 4:
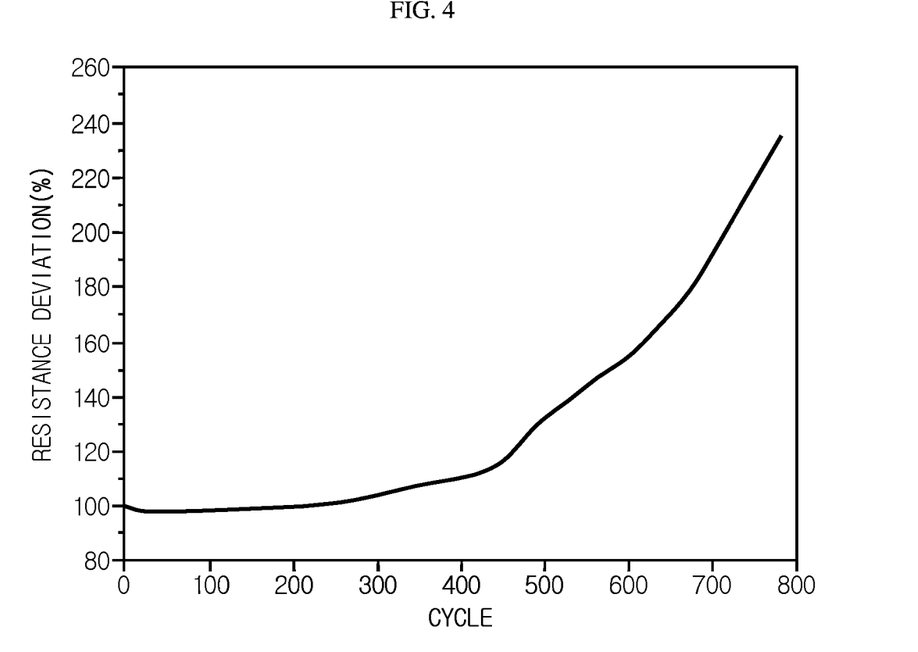
FIG. 4 is a diagram schematically showing a resistance deviation of a battery calculated by the battery diagnosing apparatus according to an embodiment of the present disclosure.

FIG. 4 is a diagram schematically showing a resistance deviation of a battery calculated by the battery diagnosing apparatus 100 according to an embodiment of the present disclosure.

Specifically, FIG. 4 is a diagram showing a resistance deviation of a battery calculated in each cycle. That is, the battery is charged until the SOC reaches the upper limit SOC in each cycle, and the resistance may be measured by the measuring unit 110 after the charging is finished. In addition, the control unit 120 may calculate a resistance deviation of the battery in each cycle based on the criterion resistance and the resistance measured in each cycle.

The control unit 120 may be configured to diagnose whether degradation of the battery is accelerated based on the voltage deviation and the resistance deviation.

Here, degradation acceleration of the battery means that degradation of the battery does not proceed linearly but is accelerated as the cycle progresses. That is, the control unit 120 may diagnose whether the degradation of the battery is being accelerated in a non-destructive way by using the calculated voltage deviation and the calculated resistance deviation.

For example, referring to FIG. 1, conventionally, it is possible to diagnose whether degradation of a battery is accelerated by generating a differential profile for the battery and checking the behavior of a peak included in the differential profile. In order to diagnose whether the degradation of a battery is accelerated in the conventional way, it is essentially demanded to generate a differential profile, and in order to generate a differential profile, a charging and discharging process for fully charging a fully discharged battery or fully discharging a fully charged battery is required. In addition, in order to calculate the differential capacity, it is required to process the voltage and capacity data of the battery obtained in the charging and discharging process.

On the other hand, the battery diagnosing apparatus 100 according to an embodiment of the present disclosure may diagnose whether degradation of the battery is accelerated based on the voltage deviation and the resistance deviation for the battery whenever the SOC of the battery reaches the upper limit SOC, without the need to completely discharge the battery.

Therefore, according to the battery diagnosing apparatus 100, the charging and discharging process (e.g., a full charging and full discharging process) unnecessary to judge whether the degradation is accelerated is not required, and there is an advantage that it may be quickly diagnosed through a relatively simple calculation whether the degradation is accelerated.

Meanwhile, the control unit 120 provided to the battery diagnosing apparatus 100 may optionally include a processor, an application-specific integrated circuit (ASIC), another chipset, a logic circuit, a register, a communication modem, and a data processing device, and the like, known in the art to execute various control logics performed in the present disclosure. In addition, when the control logic is implemented in software, the control unit 120 may be implemented as a set of program modules. At this time, the program module may be stored in a memory and executed by the control unit 120. The memory may be provided in or out of the control unit 120, and may be connected to the control unit 120 by various well-known means.

In addition, the battery diagnosing apparatus 100 may further include a storage unit 130. The storage unit 130 may store data or programs necessary for operation and function of each component of the battery diagnosing apparatus 100, data generated in the process of performing the operation or function, or the like. The storage unit 130 is not particularly limited in its kind as long as it is a known information storage means that can record, erase, update and read data. As an example, the information storage means may include random access memory (RAM), flash memory, read-only memory (ROM), electrically erasable programmable read-only memory (EEPROM), registers, and the like. In addition, the storage unit 130 may store program codes in which processes executable by the control unit 120 are defined.

For example, the storage unit 130 may store the voltage information and the resistance information for the battery. In addition, the storage unit 130 may store the voltage deviation and the resistance deviation for each cycle of the battery.

Hereinafter, the contents of the control unit 120 for diagnosing whether the degradation of the battery is accelerated will be described in detail.

The control unit 120 may be configured to calculate a voltage-resistance ratio, which is a ratio of the resistance deviation to the voltage deviation, whenever the charging of the battery is finished.

Specifically, the voltage-resistance ratio may mean a ratio of resistance deviation to voltage deviation calculated in the same cycle. For example, the voltage-resistance ratio may be calculated according to the formula of "(resistance deviation−100)÷|voltage deviation|". Here, |voltage deviation| means the absolute value of the voltage deviation.

Figure 5:
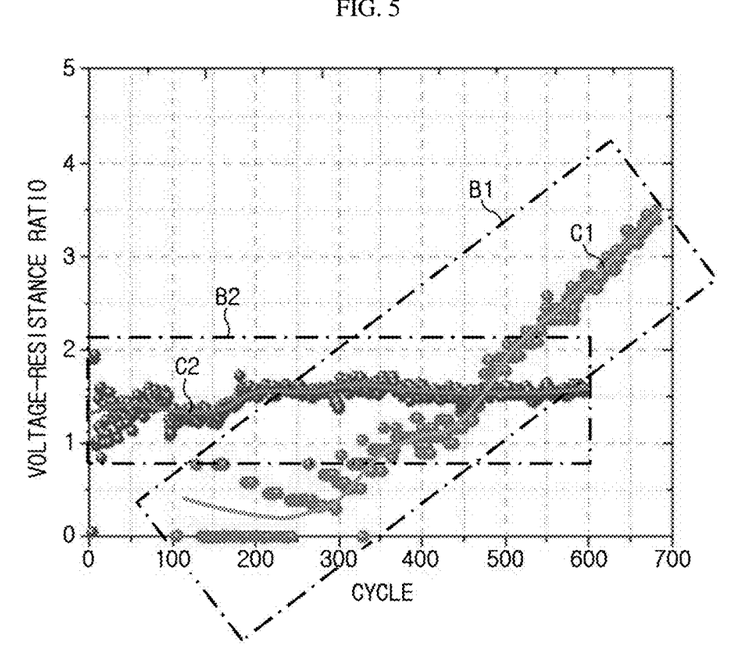
FIG. 5 is a diagram schematically showing a voltage-resistance ratio of a first battery and a second battery calculated by the battery diagnosing apparatus according to an embodiment of the present disclosure.

FIG. 5 is a diagram schematically showing a voltage-resistance ratio of a first battery B1 and a second battery B2 calculated by the battery diagnosing apparatus 100 according to an embodiment of the present disclosure.

Here, the first battery B1 is an NCM622 battery having a nickel content of 60% in the positive electrode material, and the second battery B2 is a nickel-cobalt-manganese-aluminum (NCMA) battery having a nickel content of 83% in the positive electrode material.

For example, in the embodiment of FIG. 5, the voltage-resistance ratio is measured from the 0 cycle to the 600 cycle for the first battery B1, and the voltage-resistance ratio is measured from the 100 cycle to the 670 cycle for the second battery B2.

In addition, the first battery B1 and the second battery B2 are charged to the same upper limit SOC at the same C-rate in each cycle. That is, it should be noted that the conditions such as charge and discharge temperature, charge C-rate, discharge C-rate, and upper limit SOC are all the same except for the nickel content contained in the positive electrode material of each of the first battery B1 and the second battery B2.

The control unit 120 may be configured to diagnose whether degradation of the battery is accelerated based on a plurality of calculated voltage-resistance ratios.

Specifically, the control unit 120 may be configured to determine an increase/decrease pattern between the plurality of voltage-resistance ratios.

Here, the increase/decrease pattern may include an increase pattern, a decrease pattern, and a maintenance pattern. The increase pattern means a pattern in which the voltage-resistance ratio increases as the cycle progresses, the decrease pattern means a pattern in which the voltage-resistance ratio decreases as the cycle progresses, and the maintenance pattern means a pattern in which the voltage-resistance ratio is maintained constant within a predetermined range.

The control unit 120 may be configured to diagnose whether degradation of the battery is accelerated according to a determined increase/decrease pattern.

In particular, the control unit 120 may be configured to diagnose that degradation of the battery is accelerated when the increase/decrease pattern is determined as an increase pattern.

For example, in the embodiment of FIG. 5, the voltage-resistance ratio of the first battery B1 increases as the cycle progresses, and the voltage-resistance ratio of the second battery B2 is maintained constant within a predetermined range even as the cycle progresses. Accordingly, the control unit 120 may determine the increase/decrease pattern of the voltage-resistance ratio of the first battery B1 as the increase pattern and determine the increase/decrease pattern of the voltage-resistance ratio of the second battery B2 as the maintenance pattern. In addition, the control unit 120 may diagnose that the degradation of the first battery B1 whose increase/decrease pattern is determined as the increase pattern is accelerated.

More specifically, the control unit 120 may be configured to compare the change rate for the plurality of voltage-resistance ratios with a preset criterion change rate and determine the increase/decrease pattern based on the comparison result.

Specifically, when the slope of the fluctuation curve is equal to or greater than the criterion change rate, the control unit 120 may be configured to determine that the increase/decrease pattern is the increase pattern.

Here, the criterion change rate may be a change rate that is a criterion for determining the increase/decrease pattern as an increase pattern. For example, if the change rate of the voltage-resistance ratio is equal to or greater than the criterion change rate, the control unit 120 may determine that the increase/decrease pattern of the voltage-resistance ratio of the battery is an increase pattern.

Preferably, in order to compare the criterion change rate and the change rate of the voltage-resistance ratio, the control unit 120 may be configured to generate a fluctuation curve for the plurality of voltage-resistance ratios.

For example, the control unit 120 may generate a fluctuation curve by calculating a median value between voltage-resistance ratios for two consecutive cycles and connecting a plurality of calculated median values. However, it should be noted that the fluctuation curve suffices as long as it represents an increase or decrease for a plurality of voltage-resistance ratios, and is not limited as being generated using a median value as in the above embodiment.

In the embodiment of FIG. 5, the fluctuation curve generated for the first battery B1 may be represented by a line segment C1, and the fluctuation curve generated for the second battery B2 may be represented by a line segment C2.

For example, the change rate of the voltage-resistance ratio near about the 300 cycle in the fluctuation curve C1 for the first battery B1 may be equal to or greater than the criterion change rate. Accordingly, the control unit 120 may determine that the increase/decrease pattern of the voltage-resistance ratio for the first battery B1 is an increase pattern and diagnose that the degradation of the first battery B1 is accelerated from about the 300 cycle. In this case, the control unit 120 may prevent the degradation of the first battery B1 from being accelerated more and more after about the 300 cycle by reducing the upper limit SOC preset for the first battery B1.

Conversely, in the fluctuation curve C2 for the second battery B2, the change rate of the voltage-resistance ratio may be less than the criterion change rate during the period from the 0 cycle to the 600 cycle. Therefore, the control unit 120 may diagnose that the degradation of the second battery B2 is not accelerated.

The battery diagnosing apparatus 100 according to an embodiment of the present disclosure may quickly diagnose whether degradation of the battery is accelerated based on the voltage and resistance measured whenever charging of the battery is finished. That is, since the battery diagnosing apparatus 100 may diagnose whether the degradation of the battery is accelerated as long as the SOC of the battery reaches the upper limit SOC and charging is finished, there is a practical advantage that whether degradation of the battery is accelerated can be more rapidly diagnosed, compared to the conventional method of judging whether degradation of the battery is accelerated.

Meanwhile, the control unit 120 may be configured to judge that the battery contains a high nickel-based positive electrode material, when the increase/decrease pattern is determined as an increase pattern.

That is, the control unit 120 may classify the types of batteries based on the increase/decrease pattern of the plurality of voltage-resistance ratios. Specifically, the control unit 120 may classify the battery into a low nickel-based battery (a battery in which the nickel content in the positive electrode material is less than 80%) or a high nickel-based battery (a battery in which the nickel content in the positive electrode material is 80% or more).

For example, in the case of a battery in which the composition of the positive electrode material is uncertain, there is a problem in that the composition of the positive electrode material must be checked by disassembling the battery in the prior art. However, according to an embodiment of the present disclosure, the composition of the positive electrode material of the battery can be easily checked according to the increase/decrease pattern of the plurality of voltage-resistance ratios.

In the embodiment of FIG. 5, it may be found that the first battery B1, which is a high nickel-based battery, clearly shows that the increase/decrease pattern of the voltage-resistance ratio is an increase pattern, but the second battery B2, which is a low nickel-based battery, does not show that the increase/decrease pattern of the voltage-resistance ratio is an increase pattern. Since this can be seen as a difference due to the nickel content contained in the positive electrode material of the first battery B1 and the second battery B2, the battery diagnosing apparatus 100 has an advantage of distinguishing the type of the battery according to the composition of the positive electrode material in the process of diagnosing whether the degradation of the battery is accelerated.

Meanwhile, the control unit 120 may be configured to reduce the preset upper limit SOC when the increase/decrease pattern is determined as an increase pattern.

For example, when the increase/decrease pattern is determined as an increase pattern, the degradation of the battery may be in a state of being accelerated. In this case, in order to prevent degradation of the battery from being accelerated, the control unit 120 may reduce the upper limit SOC set for the battery. That is, as the upper limit SOC is reduced, the use of the SOC section in which the battery is rapidly degraded is restricted, and thus the lifespan of the battery may be increased.

Therefore, the battery diagnosing apparatus 100 not only diagnoses whether degradation of a battery is accelerated in a non-destructive way based on the voltage deviation and the resistance deviation, but also has an advantage of increasing the lifespan of the battery by adjusting the upper limit SOC set for the battery.

The battery diagnosing apparatus 100 according to the present disclosure may be applied to a BMS (Battery Management System). That is, the BMS according to the present disclosure may include the battery diagnosing apparatus 100 described above. In this configuration, at least some components of the battery diagnosing apparatus 100 may be implemented by supplementing or adding functions of the configuration included in the conventional BMS. For example, the voltage measuring unit 110, the control unit 120 and the storage unit 130 of the battery diagnosing apparatus 100 may be implemented as components of the BMS.

Figure 6:
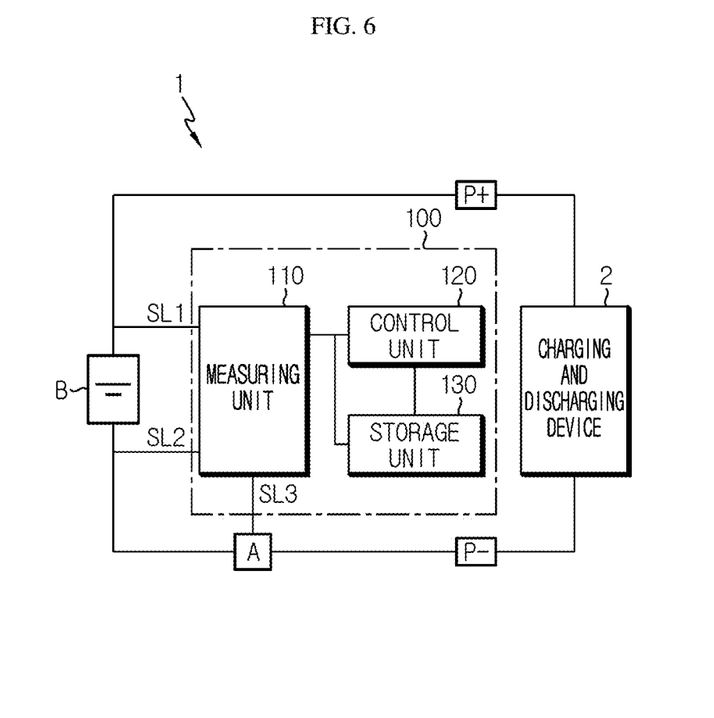
FIG. 6 is a diagram schematically showing an exemplary configuration of a battery pack according to another embodiment of the present disclosure.

FIG. 6 is a diagram schematically showing an exemplary configuration of a battery pack according to another embodiment of the present disclosure.

The battery diagnosing apparatus 100 according to the present disclosure may be provided to a battery pack. That is, the battery pack according to the present disclosure may include the battery diagnosing apparatus 100 described above and at least one battery cell. In addition, the battery pack may further include electrical equipment (a relay, a fuse, etc.) and a case.

Referring to FIG. 6, a charging and discharging device 2 may be connected to the battery B through a positive electrode terminal (P+) and a negative electrode terminal (P−) of a battery pack 1. The charging and discharging device 2 may be configured to charge and discharge the battery B. Preferably, the charging and discharging device 2 may charge the battery B until the SOC of the battery B reaches the upper limit SOC. Also, when the upper limit SOC is changed by the control unit 120, the charging and discharging device 2 may charge the battery B until the SOC of the battery B reaches the changed upper limit SOC.

The measuring unit 110 may be connected to the battery B through a first sensing line SL1 and a second sensing line SL2. The measuring unit 110 may measure a positive electrode voltage of the battery B through the first sensing line SL1 and measure a negative electrode voltage of the battery B through the second sensing line SL2. In addition, the measuring unit 110 may measure the voltage of the battery B by calculating a difference between the measured positive electrode voltage and the measured negative electrode voltage.

In addition, the measuring unit 110 may be connected to a current measuring unit A through a third sensing line SL3. The measuring unit 110 may measure the charging current and the discharging current of the battery B through the current measuring unit A. For example, the measuring unit 110 may measure the discharge current of the battery B through the current measuring unit A and measure the discharge amount of the battery B by accumulating the measured discharge current.

Figure 7:
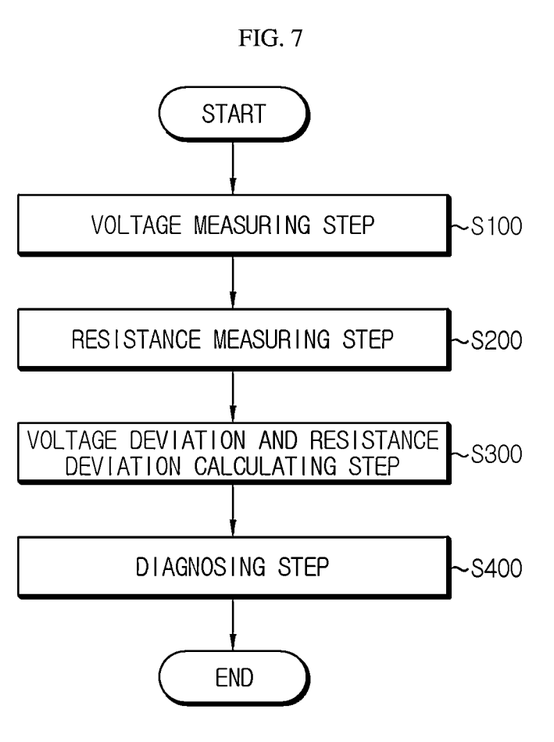
FIG. 7 is a diagram schematically showing a battery diagnosing method according to still another embodiment of the present disclosure.

FIG. 7 is a diagram schematically showing a battery diagnosing method according to still another embodiment of the present disclosure.

Preferably, each step of the battery diagnosing method may be performed by the battery diagnosing apparatus 100. Hereinafter, content overlapping with the previously described content will be omitted or briefly described.

Referring to FIG. 7, the battery diagnosing method may include a voltage measuring step (S100), a resistance measuring step (S200), a voltage deviation and resistance deviation calculating step (S300) and a diagnosing step (S400).

The voltage measuring step (S100) is a step of measuring an OCV of the battery after the charging of the battery is finished, and may be performed by the measuring unit 110.

For example, the measuring unit 110 may measure the OCV of the battery after the battery is charged until reaching the set upper limit SOC.

The resistance measuring step (S200) is a step of measuring a resistance of the battery while the battery is discharged for a predetermined time after the charging of the battery is finished, and may be performed by the measuring unit 110.

For example, after the battery is charged until reaching the set upper limit SOC, the measuring unit 110 may measure the resistance of the battery while the battery is discharged for about 1 minute. Specifically, the measuring unit 110 may measure the OCV of the battery first and then measure the resistance of the battery based on a voltage drop value and a discharge amount while the battery is being discharged.

The voltage deviation and resistance deviation calculating step (S300) is a step of calculating a voltage deviation between the OCV and a criterion voltage preset for the battery and calculating a resistance deviation between the resistance and a criterion resistance preset for the battery, and may be performed by the control unit 120.

For example, the control unit 120 may calculate a voltage deviation for each cycle according to the formula of "OCV−criterion voltage". In addition, the control unit 120 may calculate the resistance deviation for each cycle according to the formula of "(resistance÷criterion resistance)×100".

The diagnosing step (S400) is a step of diagnosing whether degradation of the battery is accelerated based on the voltage deviation and the resistance deviation, and may be performed by the control unit 120.

For example, the control unit 120 may calculate the voltage-resistance ratio for each cycle according to the formula of "(resistance deviation−100)÷|voltage deviation|" and generate a fluctuation curve representing increase/decrease for the calculated voltage-resistance ratio.

In addition, if the slope of the fluctuation curve is equal to or greater than the criterion change rate, the control unit 120 may determine that the increase/decrease pattern is the increase pattern and diagnose that degradation of the battery is accelerated.

For example, in the embodiment of FIG. 5, the slope of the first fluctuation curve C1 at about the 300 cycle may be greater than or equal to the criterion change rate. That is, since the first fluctuation curve C1 is rapidly increased from about the 300 cycle, the control unit 120 may diagnose that the degradation of the first battery B1 is accelerated from about the 300 cycle.

Conversely, in the second fluctuation curve C2, the slope may be less than the criterion change rate in the entire cycle period (the 0 cycle to the 600 cycle). The control unit 120 may diagnose that the degradation of the second battery B2 is not accelerated in the entire cycle section.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

1: battery pack
100: battery diagnosing apparatus
110: measuring unit
120: control unit
130: storage unit

What is claimed is:

1. A battery diagnosing apparatus, comprising:
a controller; and
memory having programmed thereon instruction that, when executed, are configured to cause the controller to: for each charging cycle of a plurality of charging cycles of a battery,
receive a measurement of an open circuit voltage (OCV) of the battery after charging of the battery is finished and a measurement of a resistance of the battery while the battery is discharged for a predetermined time after the charging of the battery is finished, wherein the battery is configured to finish charging when a state of charge (SOC) of the battery reaches a preset upper limit SOC; and
receive voltage information for the OCV of the battery and resistance information for the resistance of the battery;
calculate a voltage deviation between the OCV and a criterion voltage preset for the battery;
calculate a resistance deviation between the resistance and a criterion resistance preset for the battery;
calculate a ratio between the voltage deviation and the resistance deviation; and
diagnose whether degradation of the battery is accelerated based on ratios between voltage deviations and resistance deviations, calculated for respective charging cycles of the battery.

2. The battery diagnosing apparatus according to claim 1, wherein the instructions are configured to cause the controller to:
determine an increase/decrease pattern between the plurality of voltage-resistance ratios; and
diagnose whether degradation of the battery is accelerated according to the determined increase/decrease pattern.

3. The battery diagnosing apparatus according to claim 2, wherein the instructions are configured to cause the controller to diagnose that degradation of the battery is accelerated when the increase/decrease pattern is determined to be an increase pattern.

4. The battery diagnosing apparatus according to claim 2, wherein the instructions are configured to cause the controller to reduce the preset upper limit SOC when the increase/decrease pattern is determined to be an increase pattern.

5. The battery diagnosing apparatus according to claim 2, wherein the instructions are configured to cause the controller to:
compare a change rate for the plurality of voltage-resistance ratios with a preset criterion change rate; and
determine the increase/decrease pattern based on the comparison result.

6. The battery diagnosing apparatus according to claim 5, wherein the instructions are configured to cause the controller to:
generate a fluctuation curve representing increase/decrease for the plurality of voltage-resistance ratios; and
determine that the increase/decrease pattern is an increase pattern when a slope of the fluctuation curve is equal to or greater than the criterion change rate.

7. The battery diagnosing apparatus according to claim 2, wherein the instructions are configured to cause the controller to determine that a high nickel-based positive electrode material is contained in the battery when the increase/decrease pattern is determined to be an increase pattern.

8. A battery pack, comprising the battery diagnosing apparatus according to claim 1.

9. A battery diagnosing method, comprising: for each charging cycle of a plurality of charging cycles of a battery,
receiving, by a controller, a measurement of an OCV of the battery after charging of the battery is finished, wherein the charging is finished when a state of charge (SOC) of the battery reaches a preset upper limit SOC;
receiving, by the controller, a measurement of a resistance of the battery while the battery is discharged for a predetermined time after the charging of the battery is finished;
calculating, by the controller, a voltage deviation between the OCV and a criterion voltage preset for the battery;
calculating, by the controller, a resistance deviation between the resistance and a criterion resistance preset for the battery;
calculating, by the controller, a ratio between the voltage deviation and the resistance deviation; and
diagnosing, by the controller, whether degradation of the battery is accelerated based on ratios between voltage deviations and resistance deviations, calculated for respective charging cycles of the battery.

\* \* \* \* \*